US006739367B1

(12) United States Patent
Totani

(10) Patent No.: US 6,739,367 B1
(45) Date of Patent: May 25, 2004

(54) PLASTIC FILM HEAT SEAL APPARATUS

(75) Inventor: Mikio Totani, Muko (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 10/283,249

(22) Filed: Oct. 30, 2002

(51) Int. Cl.[7] .............................................. B30B 15/00
(52) U.S. Cl. .................................... 156/498; 156/583.1
(58) Field of Search ................................ 156/228, 289, 156/290, 308.2, 308.4, 498, 537, 580, 581, 583.1

(56) References Cited

U.S. PATENT DOCUMENTS

| 4,313,781 A | * | 2/1982 | Rovigo ........................ 156/530 |
| 4,954,206 A | * | 9/1990 | Voss ............................ 156/537 |
| 6,558,491 B2 | * | 5/2003 | Jahn et al. .................. 156/73.1 |

* cited by examiner

Primary Examiner—James Sells
(74) Attorney, Agent, or Firm—Westerman, Hattori, Daniels & Adrian, LLP

(57) ABSTRACT

The invention relates to a plastic film heat seal apparatus which comprises a heat seal bar covered with at least one low adhesive sheet. The heat seal bar is pressed against superposed layers of plastic film so that the layers of plastic film can be heat sealed with each other by the heat seal bar to have a heat sealed portion whenever the layers of plastic film are intermittently fed in a direction and temporarily stopped. The low adhesive sheet is interposed between the heat seal bar and the layers of plastic film for protection of the layers of plastic film when the heat seal bar is pressed against the layers of plastic film. The heat seal bar is then retreated and spaced from the layers of plastic film to permit the layers of plastic film to be fed again after being heat sealed. The heat sealed portion includes upstream and downstream edges in the plastic film feeding direction. The apparatus further comprises loosening means by which the low adhesive sheet is loosened at a position upstream of the heat seal bar in the plastic film feeding direction after the heat seal bar is pressed against the layers of plastic film. The apparatus further comprises holding means by which the low adhesive sheet is held at a position downstream of the heat seal bar in the plastic film feeding direction. The low adhesive sheet is therefore pulled by and peeled off the layers of plastic film gradually and progressively in a direction to the upstream edge from the downstream edge of the heat sealed portion when the layers of plastic film are fed again after being heat sealed.

6 Claims, 2 Drawing Sheets

PLASTIC FILM HEAT SEAL APPARATUS

FIELD OF THE INVENTION

The invention relates to a plastic film heat seal apparatus.

PRIOR ART

There has been commercially available a plastic bag making machine in which a heat seal bar is pressed against superposed layers of plastic film so that the layers of plastic film can be heat sealed with each other by the heat seal bar to have a heat sealed portion whenever the layers of plastic film are intermittently fed in a direction and temporarily stopped. The heat seal bar is then retreated and spaced from the layers of plastic film to permit the layers of plastic film to be fed again after being heat sealed. This arrangement is essential to successively make plastic bags. In addition, it is frequent practice in the apparatus that the heat seal bar is covered with at least one low adhesive sheet. The low adhesive sheet is interposed between the heat seal bar and the layers of plastic film for protection of the layers of plastic film when the heat seal bar is pressed against the layers of plastic film. The low adhesive sheet may be patterned with meshes so that the layers of plastic film can be heat sealed to be patterned with meshes by the low adhesive sheet. The low adhesive sheet may be a glass wool teflon (trade mark) sheet.

However, the low adhesive sheet should adhere to the layers of plastic film while the heat seal bar is pressed against the layers of plastic film. The low adhesive sheet is then pulled from and peeled off the layers of plastic film abruptly and at once all over the heat sealed portion of the layers of plastic film to generate a large noise when the heat seal bar is retreated and spaced from the layers of plastic film after the layers of plastic film are heat sealed. The heat sealed portion may therefore be damaged by the low adhesive sheet, resulting in seal defect. The layers of plastic film may be fed again while the low adhesive sheet is not peeled off but kept adhering to the layers of plastic film, resulting in snaking of the layers of plastic film. The layers of plastic film may be fed again to be elongated by the low adhesive sheet not peeled off, resulting in irregularity in fed pitch or fed length.

It is also usual in the apparatus that a cooling bar is pressed against the layers of plastic film so that the layers of plastic film can be cooled by the cooling bar after being heat sealed to have a cooled portion whenever the layers of plastic film are intermittently fed in the plastic film feeding direction and temporarily stopped, The cooling bar is then retreated and spaced from the layers of plastic film to permit the layers of plastic film to be fed again after being cooled. The cooling bar may be covered with at least one low adhesive sheet which is interposed between the cooling bar and the layers of plastic film for protection of the layers of plastic film when the cooling bar is pressed against the layers of plastic film.

However, the adhesive sheet should adhere to the layers of plastic film while the cooling bar is pressed against the layers of plastic film. The low adhesive sheet is then pulled from and peeled off the layers of plastic film abruptly and at once all over the cooled portion of the layers to generate a large noise when the cooling bar is retreated and spaced from the layers of plastic film after the layers of plastic film are cooled. This may result in seal defect, snaking of the layers of plastic film and irregularity in fed pitch or fed length, as in the case of the low adhesive sheet of the heat seal bar.

It is therefore an object of the invention to provide a new and improved plastic film heat seal apparatus to overcome the above problems.

Another object of the invention is to provide the apparatus in which the low adhesive sheet can be peeled off the layers of plastic film conveniently and smoothly.

SUMMARY OF THE INVENTION

According to the invention, there is provided a plastic film heat seal apparatus which comprises a heat seal bar covered with at least one low adhesive sheet. The heat seal bar is pressed against superposed layers of plastic film so that the layers of plastic film can be heat sealed with each other by the heat seal bar to have a heat sealed portion whenever the layers of plastic film are intermittently fed in a direction and temporarily stopped. The low adhesive sheet is interposed between the heat seal bar and the layers of plastic film for protection of the layers of plastic film when the heat seal bar is pressed against the layers of plastic film. The heat seal bar is then retreated and spaced from the layers of plastic film to permit the layers of plastic film to be fed again after being heat sealed. The heat sealed portion includes upstream and downstream edges in the plastic film feeding direction.

The apparatus further comprises loosening means by which the low adhesive sheet is loosened at a position upstream of the heat seal bar in the plastic film feeding direction after the heat seal bar is pressed against the layers of plastic film The apparatus further comprises holding means by which the low adhesive sheet is held at a position downstream of the heat seal bar in the plastic film feeding direction. The low adhesive sheet is therefore pulled by and peeled off the layers of plastic film gradually and progressively in a direction to the upstream edge from the downstream edge of the heat sealed portion when the layers of plastic film are fed again after being heat sealed.

In a preferred embodiment, the heat seal bar is positioned on the upper side of the layers of plastic film. The loosening means comprises a first member disposed at a position upstream of the heat seal bar in the plastic film feeding direction. The low adhesive sheet extends upward toward the first member to be engaged with the first member. The loosening means further comprises drive means connected to the first member. The first member is moved downward by the drive means so that the low adhesive sheet can be loosened by the first member. The holding means comprises a second member disposed at a position downstream of the heat seal bar in the plastic film feeding direction. The low adhesive sheet extends upward toward the second member to be engaged with and held by the second member.

The apparatus further comprises a rubber covered with at least one additional low adhesive sheet. The layers of plastic film are directed between the heat seal bar and the rubber. The heat seal bar is pressed against the layers of plastic film and the rubber with the additional low adhesive sheet interposed between the rubber and the layers of plastic film.

The apparatus further comprises additional loosening means by which the additional low adhesive sheet is loosened at a position upstream of the rubber in the plastic film feeding direction after the heat seal bar is pressed against the layers of plastic film and the rubber. The apparatus further comprises additional holding means by which the additional low adhesive sheet is held at a position downstream of the rubber in the plastic film feeding direction. The additional low adhesive sheet is therefore pulled by and peeled off the layers of plastic film gradually and progressively in a direction to the upstream edge from the downstream edge of the heat sealed portion when the layers of plastic film are fed again after being heat sealed.

There is also provided a plastic film heat seal apparatus which comprises a cooling bar covered with at least one low adhesive sheet. The cooling bar is pressed against superposed layers of plastic film so that the layers of plastic film can be cooled by the cooling bar after being heat sealed to have a cooled portion whenever the layers of plastic film are intermittently fed in a direction and temporarily stopped. The low adhesive sheet is interposed between the cooling bar and the layers of plastic film for protection of the layers of plastic film when the cooling bar is pressed against the layers of plastic film. The cooling bar is then retreated and spaced from the layers of plastic film to permit the layers of plastic film to be fed again after being cooled. The cooled portion includes upstream and downstream edges in the plastic film feeding direction.

The apparatus further comprises loosening means by which the low adhesive sheet is loosened at a position upstream of the cooling bar in the plastic film feeding direction after the cooling bar is pressed against the layers of plastic film. The apparatus further comprises holding means by which the low adhesive sheet is held at a position downstream of the cooling bar in the plastic film feeding direction. The low adhesive sheet is therefore pulled by and peeled off the layers of plastic film gradually and progressively in a direction to the upstream edge from the downstream edge of the cooled portion when the layers of plastic film are fed again after being cooled.

In a preferred embodiment, the cooling bar is positioned on the upper side of the layers of plastic film. The loosening means comprises a first member disposed at a position upstream of the cooling bar in the plastic film feeding direction. The low adhesive sheet extends upward toward the first member to be engaged with the first member. The loosening means further comprises drive means connected to the first member. The first member is moved downward by the drive means so that the low adhesive sheet can be loosened by the first member. The holding means comprises a second member disposed at a position downstream of the cooling bar in the plastic film feeding direction. The low adhesive sheet extends upward toward the second member to be engaged with and held by the second member.

The apparatus further comprises a rubber covered with at least one additional low adhesive sheet. The layers of plastic film is directed between the cooling bar and the rubber. The cooling bar is pressed against the layers of plastic film and the rubber with the additional low adhesive sheet interposed between the rubber and the layers of plastic film.

The apparatus further comprises additional loosening means by which the additional low adhesive sheet is loosened at a position upstream of the rubber in the plastic film feeding direction after the cooling bar is pressed against the layers of plastic film and the rubber. The apparatus further comprises additional holding means by which the additional low adhesive sheet is held at a position downstream of the rubber in the plastic film feeding direction. The additional low adhesive sheet is therefore pulled by and peeled off gradually and progressively in a direction to the upstream edge from the downstream edge of the cooled portion when the layers of plastic film are fed again after being cooled.

DETAILED DESCRIPTION OF THE PREFERRED EMBODIMENT

Figure 1:
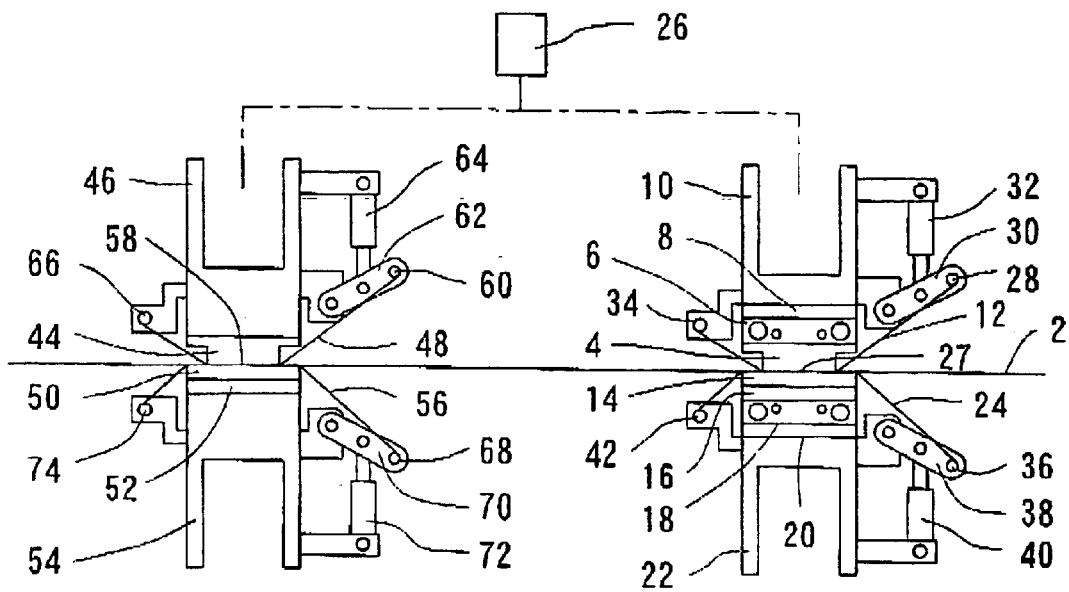
FIG. 1 is an explanatory view of a preferred embodiment of the invention.

Referring now to the drawings, FIG. 1 illustrates a plastic film heat seal apparatus according to the invention. The apparatus is incorporated into a plastic bag making machine including plastic film feeding means by which superposed layers of plastic film 2 are intermittently fed in a direction to successively make plastic bags.

The apparatus includes a heat seal bar 4 combined with a heater 6 and a thermal insulation 8, mounted on a frame 10 and covered with a low adhesive sheet 12 which comprises a glass wool teflon (trade mark) sheet. The apparatus further includes a rubber 14 opposed to the heat seal bar 4, fixed to a base 16, combined with a heater 18 and a thermal insulation 20, mounted on a frame 22 and covered with an additional low adhesive sheet 24 which also comprises a glass wool teflon (trade mark) sheet. The layers of plastic film 2 are directed between the heat seal bar 4 and the rubber 14. The heat seal bar 4 is disposed on the upper side of the layers of plastic film 2. The rubber 14 is disposed on the lower side of the layers of plastic film 2.

The apparatus further includes drive means 26 connected to the frame 10. The heat seal bar 4, the heater 6, the thermal insulation 8 and the frame 10 are moved downward by the drive means 26 whenever the layers of plastic film 2 are intermittently fed in the plastic film feeding direction. The heat seal bar 4 is therefore advanced toward and pressed against the layers of plastic film 2 and the rubber 14 so that the layers of plastic film 2 can be heat sealed with each other by the heat seal bar 4 and the rubber 14 to have a heat sealed portion 27 whenever the layers of plastic film 2 are intermittently fed in the plastic film feeding direction and temporarily stopped. The low adhesive sheet 12 is interposed between the heat seal bar 4 and the layers of plastic film 2 for protection of the layers of plastic film 2 when the heat seal bar 4 is pressed against the layers of plastic film 2 and the rubber 14. The additional low adhesive sheet 24 is interposed between the rubber 14 and the layers of plastic film 2 for protection of the layers of plastic film 2. The low adhesive sheet 12 and the additional low adhesive sheet 24 are patterned with meshes so that the layers of plastic film 2 can be heat sealed to be patterned with meshes by the low adhesive sheet 12 and the additional sheet 24. The heat seal bar 4 is then moved upward by the drive means 26 and retreated and spaced from the layers of plastic film 2 to permit the layers of plastic film 2 to be fed again after being heat sealed. The heat sealed portion 27 includes upstream and downward edges in the plastic film feeding direction.

In the apparatus, the low adhesive sheet 12 should adhere to the layers of plastic film 2 while the heat seal bar 4 is pressed against the layers of plastic film 2 and the rubber 14. Under the circumstances, the apparatus further includes loosening means by which the low adhesive sheet 12 is loosened at a position upstream of the heat seal bar 4 in the plastic film feeding direction after the heat seal bar 4 is pressed against the layers of plastic film 2 and the rubber 14. The apparatus further includes holding means by which the low adhesive sheet 12 is held at a position downstream of the heat seal bar 4 in the plastic film feeding direction.

The loosening means includes a first member comprising a first shaft 28. The first shaft 28 is disposed at a position upstream of the heat seal bar 4 in the plastic film feeding direction and mounted on an arm 30 which is supported by the frame 10 for swingingly movement. The low adhesive sheet 12 extends upward toward the first shaft 28 to be engaged with and wound about the first shaft 28. The loosening means further includes drive means comprising an air cylinder 32 and connected to the arm 30 and the first shaft 28. The first shaft 28 is moved downward integrally with the arm 30 which is swingingly moved by the air cylinder 32 so that the low adhesive sheet 12 can be loosened by the first shaft 28. The holding means comprises a second member comprising a second shaft 34. The second shaft 34 is disposed at a position downstream of the heat seal bar 4 in the plastic film feeding direction and supported by the frame 10. The low adhesive sheet 12 extends upward toward the second shaft 34 to be engaged with, wound about and held by the second shaft 34.

The additional low adhesive sheet 24 also adheres to the layers of plastic film 2 while the heat seal bar 4 is pressed against the layers of plastic film 2 and the rubber 14. In this connection, the apparatus further includes additional loosening means by which the additional low adhesive sheet 24 is loosened at a position upstream of the rubber 14 in the plastic film feeding direction after the heat seal bar 4 is pressed against the layers of plastic film 2 and the rubber 14. The apparatus further includes additional holding means by which the additional low adhesive sheet 24 is held at a position downstream of the rubber 14 in the plastic film feeding direction.

The additional loosening means includes an additional first member comprising an additional first shaft 36. The additional first shaft 36 is disposed at a position upstream of the rubber 14 in the plastic film feeding direction and mounted on an arm 38 which is supported by the frame 22 for swingingly movement. The additional low adhesive sheet 24 extends downward toward the additional first shaft 36 to be engaged with and wound about the additional first shaft 36. The additional loosening means further includes drive means comprising an air cylinder 40 and connected to the arm 38 and the additional first shaft 36. The additional first shaft 36 is moved upward integrally with the arm 38 which is swingingly moved by the air cylinder 40 so that the additional low adhesive sheet 24 can be loosened by the additional first shaft 36. The additional holding means comprises an additional second member comprising an additional second shaft 42 disposed at a position downstream of the rubber 14 in the plastic film feeding direction and supported by the frame 22. The additional low adhesive sheet 24 extends downward toward the additional second shaft 42 to be engaged with, wound about and held by the additional second shaft 42.

Figure 2:
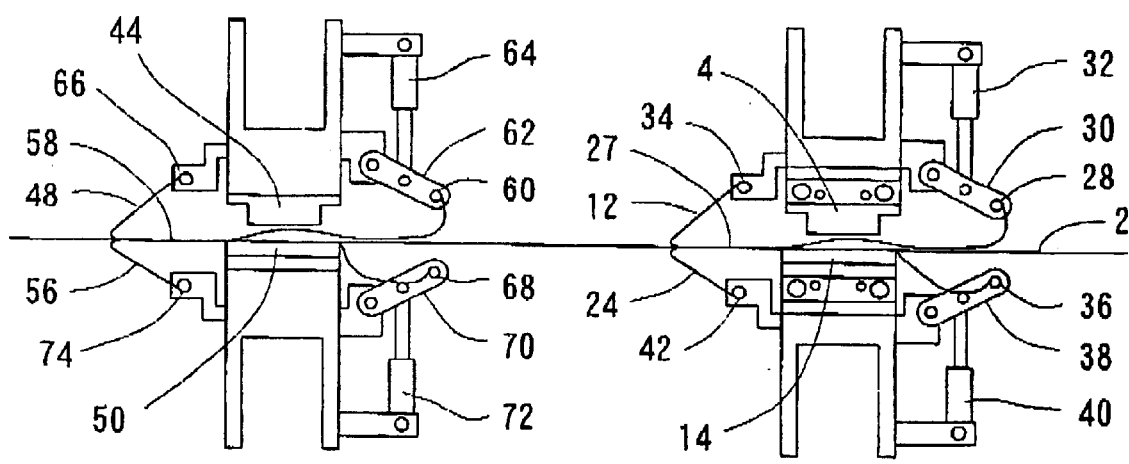
FIG. 2 is an explanatory view illustrating the low adhesive sheets when being peeled off the layers of plastic film of FIG. 1.

In the apparatus, the low adhesive sheet 12 and the additional adhesive sheet 24 are loosened by the first shaft 28 and the additional first shaft 36 at the same time after the heat seal bar 4 is pressed against the layers of plastic film 2 and the rubber 16, the layers of plastic film 2 being heat sealed with each other. The heat seal bar 4 is then moved upward by the drive means 26 and retreated and spaced from the layers of plastic film 2 to permit the layers of plastic film 2 to be fed again after being heat sealed. The layers of plastic film 2 are then fed again so that the low adhesive sheet 12 will be pulled and moved by the layers of plastic film 2 to be stretched between the second shaft 34 and the layers of plastic film 2 and kept being loosened between the first shaft 28 and the layers of plastic film 2, as shown in FIG. 2. The additional low adhesive sheet 24 is also pulled and moved by the layers of plastic film 2 to be stretched between the second shaft 42 and the layers of plastic film 2 and kept being loosened between the first shaft 36 and the layers of plastic film 2. Accordingly, the low adhesive sheet 12 is then pulled by and peeled off the layers of plastic film 2 gradually and progressively in a direction to the upstream edge from the downstream edge of the heat sealed portion 27 as the layers of plastic film 2 is further fed. The additional low adhesive sheet 24 is also pulled by and peeled off the layers of plastic film 2 gradually and progressively in a direction to the upstream edge from the downstream edge of the heat sealed portion 27 as the layers of plastic film 2 is further fed.

It should therefore be recognized in the apparatus that the low adhesive sheet 12 and the additional low adhesive layer 24 are pulled by and peeled off the layers of plastic film 2 gradually and progressively in the direction to the upstream edge from the downstream edge of the heat sealed portion 27 when the layers of plastic film 2 are fed again after being heat sealed. Accordingly, the low adhesive sheet 12 and the additional low adhesive sheet 24 can be peeled off the layers of plastic film 2 conveniently and smoothly without generating a large noise and without resulting in seal defect, snaking of the layers of plastic film 2 and irregularity in fed pitch or fed length.

The apparatus further includes a cooling bar 44 mounted on a frame 46 and covered with at least one low adhesive sheet 48 which comprises a glass wool teflon (trade mark) sheet. The cooling bar 44 may be a water cooled one. The apparatus further includes a rubber 50 opposed to the cooling bar 44, fixed to a base 52, mounted on a frame 54 and covered with at least one additional low adhesive sheet 56 which also comprises a glass wool teflon (trade mark) sheet. The base 52 may also be a water cooled one. The layers of plastic film 2 are directed between the cooling bar 44 and the rubber 50 after being heat sealed. The cooling bar 44 is disposed on the upper side of the layers of plastic film 2. The rubber 50 is disposed on the lower side of the layers of plastic film 2.

In addition, the drive means 26 is connected to the frame 46. The cooling bar 44 and the frame 46 are moved downward by the drive means 26 whenever the layers of plastic film 2 are intermittently fed in the plastic film feeding direction. The cooling bar 44 is therefore advanced toward and pressed against the layers of plastic film 2 and the rubber 50 so that the layers of plastic film 2 can be cooled by the cooling bar 44 and the rubber 50 after being heat sealed to have a cooled portion 58 whenever the layers of plastic film 2 are intermittently fed in the plastic film feeding direction and temporarily stopped. The low adhesive sheet 48 is interposed between the cooling bar 44 and the layers of plastic film 2 for protection of the layers of plastic film 2 when the cooling bar 44 is pressed against the layers of plastic film 2 and the rubber 50. The additional low adhesive sheet 56 is interposed between the rubber 50 and the layers of plastic film 2 for protection of the layers of plastic film 2. The cooling bar 44 is then moved upward by the drive means 26 and retreated and spaced from the layers of plastic film 2 to permit the layers of plastic film 2 to be fed again after being cooled. The cooled portion 58 coincides with the heat sealed portion 27 of the layers of plastic film 2 and includes upstream and downward edges in the plastic film feeding direction.

In this case, the low adhesive sheet 48 should adhere to the layers of plastic film 2 while the cooling bar 44 is pressed against the layers of plastic film 2 and the rubber 50. Under the circumstances, the apparatus further includes loosening means by which the low adhesive sheet 48 is loosened at a position upstream of the cooling bar 44 in the plastic film feeding direction after the cooling bar 44 is pressed against the layers of plastic film 2 and the rubber 50. The apparatus further includes holding means by which the low adhesive sheet 48 is held at a position downstream of the cooling bar 44 in the plastic film feeding direction.

The loosening means includes a first member comprising a first shaft 60. The first shaft 60 is disposed at a position upstream of the cooling bar 44 in the plastic film feeding direction and mounted on an arm 62 which is supported by the frame 46 for swingingly movement. The low adhesive sheet 48 extends upward toward the first shaft 60 to be engaged with and wound about the first shaft 60. The loosening means further includes drive means comprising an air cylinder 64 and connected to the arm 62 and the first shaft 60. The first shaft 60 is moved downward integrally with the arm 62 which is swingingly moved by the air cylinder 64 so that the low adhesive sheet 48 can be loosened by the first shaft 60. The holding means comprises a second member comprising a second shaft 66. The second shaft 66 is disposed at a position downstream of the cooling bar 44 in the plastic film feeding direction and supported by the frame 46. The low adhesive sheet 48 extends upward toward the second shaft 66 to be engaged with, wound about and held by the second shaft 66.

The additional low adhesive sheet 56 also adheres to the layers of plastic film 2 while the cooling bar 44 is pressed against the layers of plastic film 2 and the rubber 50. In this connection, the apparatus further includes additional loosening means by which the additional low adhesive sheet 56 is loosened at a position upstream of the rubber 50 in the plastic film feeding direction after the cooling bar 44 is pressed against the layers of plastic film and the rubber 50. The apparatus further includes additional holding means by which the additional low adhesive sheet 56 is held at a position downstream of the rubber 50 in the plastic film feeding direction.

The additional loosening means includes an additional first member comprising an additional first shaft 68. The additional first shaft 68 is disposed at a position upstream of the rubber 50 in the plastic film feeding direction and mounted on an arm 70 which is supported by the frame 54 for swingingly movement. The additional low adhesive sheet 56 extends downward toward the additional first shaft 68 to be engaged with and wound about the additional first shaft 68. The additional loosening means further includes drive means comprising an air cylinder 72 and connected to the arm 70 and the additional first shaft 68. The additional first shaft 68 is moved upward integrally with the arm 70 which is swingingly moved by the air cylinder 72 so that the additional low adhesive sheet 56 can be loosened by the additional first shaft 68. The additional holding means comprises an additional second member comprising an additional second shaft 74. The additional second shaft 74 is disposed at apposition downstream of the rubber 50 in the plastic film feeding direction and supported by the frame 54. The additional low adhesive sheet 56 extends downward toward the additional second shaft 74 to be engaged with, wound about and held by the additional second shaft 74.

The low adhesive sheet 48 and the additional adhesive sheet 56 are loosened by the first shaft 60 and the additional first shaft 68 at the same time after the cooling bar 44 is pressed against the layers of plastic film 2 and the rubber 50, the layers of plastic film 2 being cooled. The cooling bar 44 is then moved upward by the drive means 26 and retreated and spaced from the layers of plastic film 2 to permit the layers of plastic film 2 to be fed again after being cooled. The layers of plastic film 2 are then fed again so that the low adhesive sheet 48 and the additional low adhesive sheet 56 will be pulled and moved by the layers of plastic film 2 to be stretched between the second shafts 66 and 74 and the layers of plastic film 2 and kept being loosened between the first shafts 60 and 68 and the layers of plastic film 2, as in the case of the low adhesive sheet 12 and the additional low adhesive sheet 24 of the heat seal bar 4 and the rubber 14. The low adhesive sheet 48 and the additional low adhesive sheet 56 are then pulled by and peeled off the layers of plastic film 2 gradually and progressively in a direction to the upstream edge from the downstream edge of the cooled portion 58 as the layers of plastic film 2 is further fed.

The low adhesive sheet 48 and the additional low adhesive sheet 56 are therefore pulled by and peeled off the layers of plastic film 2 gradually and progressively In the direction to the upstream edge from the downstream edge of the cooled portion 58 when the layers of plastic film 2 are fed again after being cooled. Accordingly, the low adhesive sheet 48 and the additional low adhesive sheet 56 can be peeled off the layers of plastic film 2 conveniently and smoothly without generating a large noise and without resulting in seal defect, snaking of the layers of plastic film 2 and irregularity in fed pitch or fed length.

Figure 3:
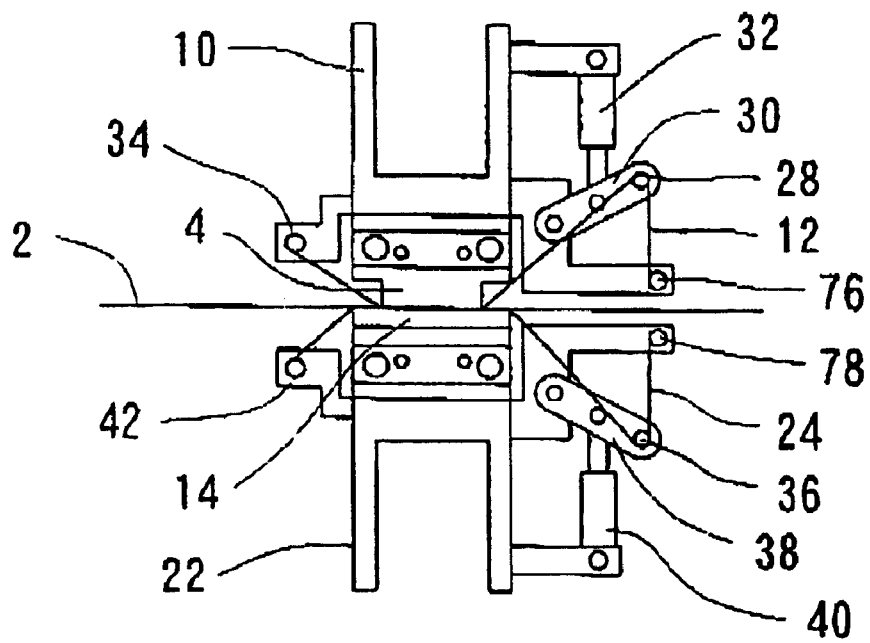
FIG. 3 is an explanatory view of other embodiment of the invention.

FIG. 3 illustrates other embodiment of the invention in which the low adhesive sheet 12 is loosened at the position upstream of the heat seal bar 4 in the plastic film feeding direction by loosening means which includes a third member comprising third shaft 76 and supported by the frame 10. The low adhesive sheet 12 extends upward toward the first shaft 28 to be merely engaged with the first shaft 28. The low adhesive sheet 12 then extends downward toward the third shaft 76 to be engaged with and wound about the third shaft 76. The additional low adhesive sheet 24 is loosened at the position upstream of the rubber 14 in the plastic film feeding direction by loosening means which includes an additional third member comprising an additional third shaft 78 and supported by the frame 22. The additional low adhesive sheet 24 extends downward toward the additional first shaft 36 to be merely engaged with the additional first shaft 36. The additional low adhesive sheet 24 then extends upward toward the additional third shaft 78 to be engaged with and fixed to the additional third shaft 78.

Figure 4:
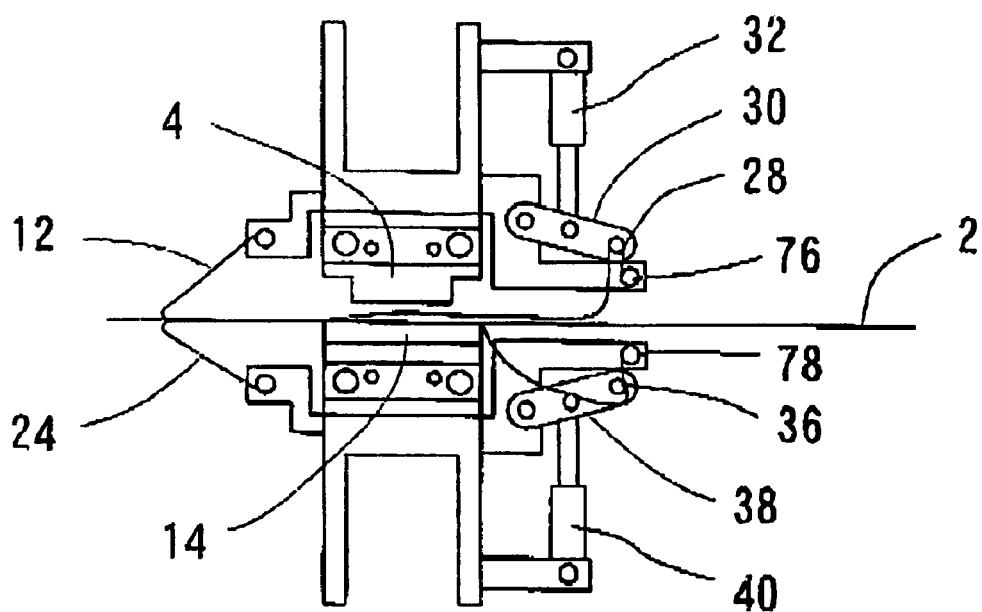
FIG. 4 is an explanatory view illustrating the low adhesive sheets when being peeled off the layers of plastic film of FIG. 3.

In the embodiment, the first shaft 28 is moved downward by the air cylinder 32 so that the low adhesive sheet 12 can be loosened with an increase in amount, as shown in FIG. 4. The additional first shaft 36 is moved upward by the cylinder 40 so that the additional low adhesive sheet 24 can be loosened with an increase in amount.

As to the low adhesive sheet 48 and the additional low adhesive sheet 56 of the cooling bar 44 and the rubber 50, they can also be loosened with an increase in amount, as in the case of the low adhesive sheet 12 and the additional low adhesive sheet 24.

Each of the low adhesive sheets 12 and 48 and the additional low adhesive sheets 24 and 56 may be any one other than grass wool teflon (trade mark) sheet. The rubber 14, the base 16, the heater 18, the thermal insulation 20 and the frame 22 may be moved upward by drive means when the heat seal bar 4 is moved downward so that the layers of plastic film 2 can be heat sealed with each other by the heat seal bar 4 and the rubber 14. The rubber 50, the base 52 and the frame 54 may also be moved upward by drive means when the cooling bar 44 is moved downward so that the layers of plastic film 2 can be cooled by the cooling bar 44 and the rubber 50.

The heat seal bar 4 may be disposed on the lower side of the layers of plastic film 2 and opposed to the rubber 14 which is disposed on the upper side of the layers of plastic film 2. The cooling bar 44 may also be disposed on the lower side of the layers of plastic film 2 and opposed to the rubber 50 which is disposed on the upper side of the layers of plastic film 2.

What is claimed is:

1. A plastic film heat seal apparatus comprising:

a heat seal bar covered with at least one low adhesive sheet, said heat seal bar being pressed against superposed layers of plastic film so that said layers of plastic film can be heat sealed with each other by said heat seal bar to have a heat sealed portion whenever said layers of plastic film are intermittently fed in a direction and temporarily stopped, said low adhesive sheet being interposed between said heat seal bar and said layers of plastic film for protection of said layers of plastic film when said heat seal bar is pressed against said layers of plastic film, said heat seal bar being then retreated and spaced from said layers of plastic film to permit said layers of plastic film to be fed again after being heat sealed, said heat sealed portion including upstream and downstream edges in said plastic film feeding direction;

loosening means by which said low adhesive sheet is loosened at a position upstream of said heat seal bar in said plastic film feeding direction after said heat seal bar is pressed against said layers of plastic film; and holding means by which said low adhesive sheet is held at a position downstream of said heat seal bar in said plastic film feeding direction, said low adhesive sheet being pulled by and peeled off said layers of plastic film gradually and progressively in a direction to said upstream edge from said downstream edge of said heat sealed portion when said layers of plastic film are fed again after being heat sealed.

2. The apparatus as set forth in claim 1 wherein said heat seal bar is positioned on the upper side of said layers of plastic film, said loosening means comprising a first member disposed at a position upstream of said heat seal bar in said plastic film feeding direction, said low adhesive sheet extending upward toward said first member to be engaged with said first member, said loosening means further comprising drive means connected to said first member, said first member being moved downward by said drive means so that said low adhesive sheet can be loosened by said first member, said holding means comprising a second member disposed at a position downstream of said heat seal bar in said plastic film feeding direction, said low adhesive sheet extending upward toward said second member to be engaged with and held by said second member.

3. The apparatus as set forth in claim 1 further comprising:

a rubber covered with at least one additional low adhesive sheet, said layers of plastic film being directed between said heat seal bar and said rubber, said heat seal bar being pressed against said layers of plastic film and said rubber with said additional low adhesive sheet interposed between said rubber and said layers of plastic film;

additional loosening means by which said additional low adhesive sheet is loosened at a position upstream of said rubber in said plastic film feeding direction after said heat seal bar is pressed against said layers of plastic film and said rubber; and additional holding means by which said additional low adhesive sheet is held at a position downstream of said rubber in said plastic film feeding direction, said additional low adhesive sheet being pulled by and peeled off said layers of plastic film gradually and progressively in a direction to said upstream edge from said downstream edge of said heat sealed portion when said layers of plastic film are fed again after being heat sealed.

4. A plastic film heat seal apparatus comprising:

a cooling bar covered with at least one low adhesive sheet, said cooling bar being pressed against superposed layers of plastic film so that said layers of plastic film can be cooled by said cooling bar after being heat sealed to have a cooled portion whenever said layers of plastic film are intermittently fed in a direction and temporarily stopped, said low adhesive sheet being interposed between said cooling bar and said layers of plastic film for protection of said layers of plastic film when said cooling bar is pressed against said layers of plastic film, said cooling bar being then retreated and spaced from said layers of plastic film to permit said layers of plastic film to be fed again after being cooled, said cooled portion including upstream and downstream edges in said plastic film feeding direction;

loosening means by which said low adhesive sheet is loosened at a position upstream of said cooling bar in said plastic film feeding direction after said cooling bar is pressed against said layers of plastic film; and holding means by which said low adhesive sheet is held at a position downstream of said cooling bar in said plastic film feeding direction, said low adhesive sheet being pulled by and peeled off said layers of plastic film gradually and progressively in a direction to said upstream edge from said downstream edge of said cooled portion when said layers of plastic film are fed again after being cooled.

5. The apparatus as set forth in claim 4 wherein said cooling bar is positioned on the upper side of said layers of plastic film, said loosening means comprising a first member disposed at a position upstream of said cooling bar in said plastic film feeding direction, said low adhesive sheet extending upward toward said first member to be engaged with said first member, said loosening means further comprising drive means connected to said first member, said first member being moved downward by said drive means so that said low adhesive sheet can be loosened by said first member, said holding means comprising a second member disposed at a position downstream of said cooling bar in said plastic film feeding direction, said low adhesive sheet extending upward toward said second member to be engaged with and held by said second member.

6. The apparatus as set forth in claim 4 further comprising:

a rubber covered with at least one additional low adhesive sheet, said layers of plastic film being directed between said cooling bar and said rubber, said cooling bar being pressed against said layers of plastic film and said rubber with said additional low adhesive sheet interposed between said rubber and said layers of plastic film;

additional loosening means by which said additional low adhesive sheet is loosened at a position upstream of said rubber in said plastic film feeding direction after said cooling bar is pressed against said layers of plastic film and said rubber; and additional holding means by which said additional low adhesive sheet is held at a position downstream of said rubber in said plastic film feeding direction, said additional low adhesive sheet being pulled by and peeled off gradually and progressively in a direction to said upstream edge from said downstream edge of said cooled portion when said layers of plastic film are fed again after being cooled.

* * * * *